(12) United States Patent
Schacknies et al.

(10) Patent No.: US 9,790,925 B2
(45) Date of Patent: Oct. 17, 2017

(54) DEVICE AND METHOD FOR ANCHORING A WIND TURBINE

(71) Applicant: Wobben Properties GmbH, Aurich (DE)

(72) Inventors: Meik Schacknies, Harsefeld (DE); Claus Goralski, Geiselgasteig (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 573 days.

(21) Appl. No.: 14/359,896

(22) PCT Filed: Nov. 16, 2012

(86) PCT No.: PCT/EP2012/072922
§ 371 (c)(1),
(2) Date: May 21, 2014

(87) PCT Pub. No.: WO2013/076021
PCT Pub. Date: May 30, 2013

(65) Prior Publication Data
US 2014/0348663 A1    Nov. 27, 2014

(30) Foreign Application Priority Data

Nov. 24, 2011   (DE) .................. 10 2011 087 022

(51) Int. Cl.
*F03D 11/04*   (2006.01)
*E02D 27/50*   (2006.01)
*E02D 27/42*   (2006.01)
*F03D 13/20*   (2016.01)

(52) U.S. Cl.
CPC .......... *F03D 11/045* (2013.01); *E02D 27/425* (2013.01); *F03D 13/22* (2016.05); *Y02E 10/728* (2013.01); *Y10T 29/49623* (2015.01)

(58) Field of Classification Search
CPC ................... F03D 13/22; E02D 27/425; Y10T 29/49623; Y02E 10/728
See application file for complete search history.

(56) References Cited

U.S. PATENT DOCUMENTS

| 723,669 | A | * | 3/1903 | Hammann | ............... E02D 27/02 |
| | | | | | 52/292 |
| 2,625,815 | A | * | 1/1953 | Black | .................. E04H 12/2261 |
| | | | | | 52/126.1 |
| 4,272,929 | A | * | 6/1981 | Hanson | ................... E02D 27/42 |
| | | | | | 416/142 |

(Continued)

FOREIGN PATENT DOCUMENTS

DE    25 44 657 A1    4/1976
DE    102 26 996 A1    4/2003

(Continued)

*Primary Examiner* — Jeanette E Chapman
(74) *Attorney, Agent, or Firm* — Seed Intellectual Property Law Group LLP

(57) ABSTRACT

The present invention concerns an anchoring section for anchoring a pylon of a wind power installation in a foundation, including a carrier portion for fixing a pylon segment for carrying the pylon and a foundation portion for concreting in a concrete mass of the foundation, and the foundation portion has at least one web portion with through openings for reinforcing bars to pass therethrough.

15 Claims, 3 Drawing Sheets

(56) References Cited

U.S. PATENT DOCUMENTS

| | | | |
|---|---|---|---|
| 4,926,061 A | 5/1990 | Arreola, Jr. | |
| 5,218,803 A * | 6/1993 | Wright | E04B 2/789 |
| | | | 52/243 |
| 6,474,030 B1 * | 11/2002 | Ueda | E02D 27/14 |
| | | | 405/229 |
| 7,513,083 B2 * | 4/2009 | Pryor | E02D 27/42 |
| | | | 403/232.1 |
| 7,614,200 B2 | 11/2009 | Wobben | |
| 7,627,995 B1 * | 12/2009 | Yoder | E04H 12/2253 |
| | | | 248/519 |
| 8,801,335 B2 | 8/2014 | Schacknies et al. | |
| 2002/0124502 A1 * | 9/2002 | Henderson | E02D 27/42 |
| | | | 52/296 |
| 2007/0006541 A1 * | 1/2007 | Seidel | E02D 27/42 |
| | | | 52/292 |
| 2010/0005742 A1 | 1/2010 | Puigcorbé Punzano et al. | |
| 2016/0097179 A1 * | 4/2016 | Henderson | E02D 27/425 |
| | | | 52/158 |

FOREIGN PATENT DOCUMENTS

| | | | | |
|---|---|---|---|---|
| DE | 20 2010 005 965 U1 | 8/2011 | | |
| DE | 102010028038 A1 | 10/2011 | | |
| DE | CA-2795286 A1 * | 10/2011 | | E02D 27/42 |
| DE | 202015100932 U1 * | 6/2015 | | F03D 13/22 |
| FR | 2601398 A1 * | 1/1988 | | E01D 19/103 |
| FR | 2601398 A1 * | 1/1988 | | E01D 19/103 |
| JP | 63181816 A * | 7/1988 | | |
| JP | 01318638 A * | 12/1989 | | |
| JP | 03199528 A * | 8/1991 | | |
| JP | 2010-236224 A | 10/2010 | | |
| RU | 2070662 C1 | 12/1996 | | |
| WO | 2008/087181 A1 | 7/2008 | | |
| WO | 2010/138978 A2 | 12/2010 | | |
| WO | 2011/029994 A1 | 3/2011 | | |
| WO | 2011/131751 A2 | 10/2011 | | |

* cited by examiner

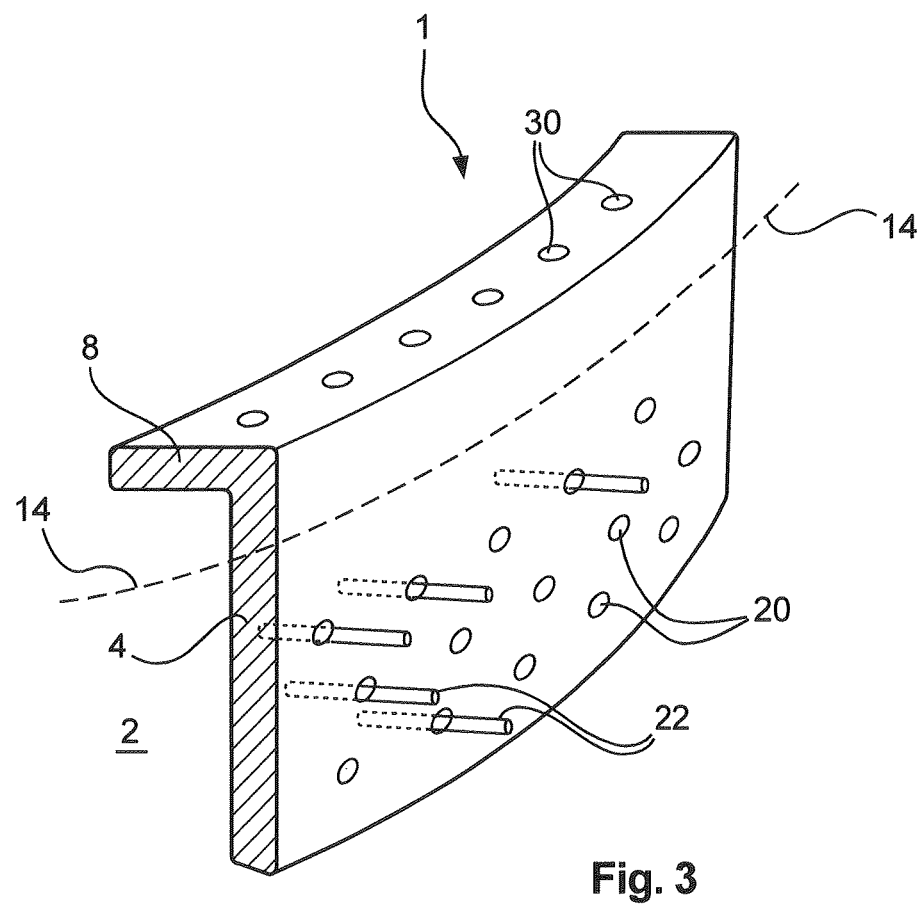
Fig. 3
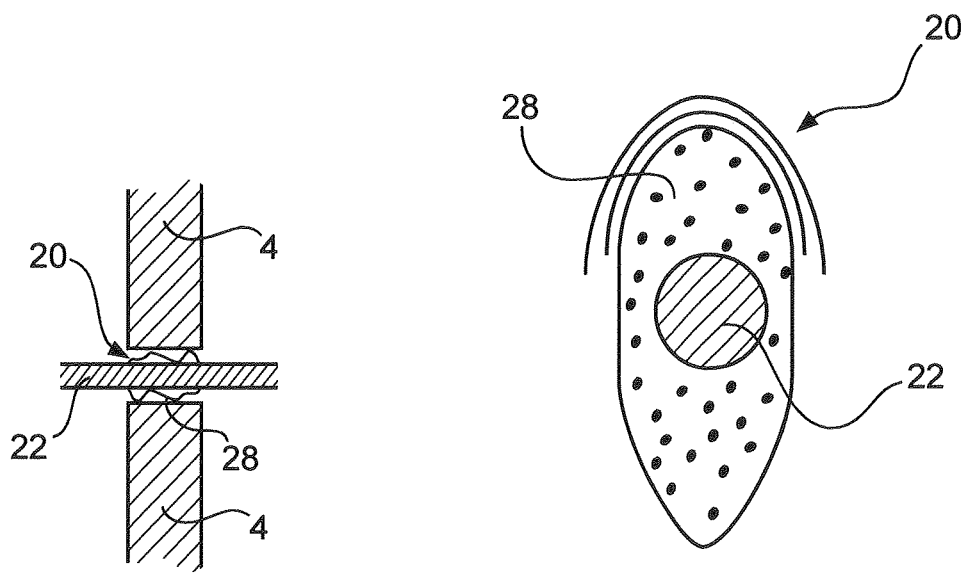
Fig. 4
Fig. 5

DEVICE AND METHOD FOR ANCHORING A WIND TURBINE

BACKGROUND

Technical Field

The present invention concerns an anchoring section for anchoring a pylon of a wind power installation in a foundation. The present invention also concerns a substructure of a pylon of the wind power installation. The invention further concerns a wind power installation and a method of anchoring a pylon of a wind power installation.

Description of the Related Art

A modern wind power installation has a pod with an aerodynamic rotor. The pod is carried on a pylon and the pylon is anchored in a foundation and carried thereby. FIG. 6 shows such a wind power installation. Nowadays pylons of wind power installations can reach a height of over 100 meters (m). The diameter of the aerodynamic rotor can also reach a diameter of over 100 m. Pylons of such wind power installations are usually made from steel and/or prestressed concrete and are enormous in weight. Added to the weight of the pylon is the weight of the pod which in the case of a gearless wind power installation can have a generator of a diameter of 10 m or even more and is of a corresponding weight which has to be carried by the foundation in addition to the weight of the pylon itself. In addition in operation of the wind power installation an enormous wind pressure applies a loading to the aerodynamic rotor and that wind pressure is ultimately passed by way of the pylon to the foundation and can there result in a tilting moment.

An anchorage for the pylon in the foundation has to carry all those loadings and pass them to the foundation without damaging the foundation or in such a way that any damage is minimized.

To anchor a steel pylon it is known for a steel section which can also be referred to as the anchoring section to be partially let into the foundation, that is to say into the concrete of the foundation, in order to fix the pylon on that anchoring section. A lowermost pylon section of a pylon is thus fixed on that anchoring section.

Such an anchoring section can basically be in the form of a T-shaped bearer which is curved to form a circle and which is concreted in place upside down, in relation to the letter T. Thus when the anchoring section is appropriately anchored in place the anchoring section has at its lowermost end a horizontal, peripherally extending flange portion (which gives the T-shaped bearer its name) and by way of which the loads occurring are transmitted into the foundation. A part of that anchoring section then projects beyond a surface of the foundation, that is to say beyond a concrete surface. That portion protruding beyond the surface, to carry loads, can have a further, peripherally extending portion, in particular a flange portion, to fix said lower pylon section thereto.

A problem with that form of anchorage is that in particular the application of load by way of the lower horizontal peripherally extending flange can lead to damage to the foundation. Expressed figuratively there is the risk, in the worst-case scenario that the anchoring section presses away in a funnel shape, a region of the concrete foundation, that is beneath the lower flange, or that at least corresponding fracture locations, fracture regions or crack regions occur in the foundation. In that respect a particular problem is that such damage can occur in the lower region of the foundation and can therefore be difficult to detect. In addition in the case of crack formation there is already the problem that water can penetrate into the crack and thus into the foundation and can worsen the damage to the foundation.

In the same manner a tensile loading occurring due to a tilting force can lead to a similar local loading in the upper region of the foundation because in that case also the lower horizontal flange can lead to a concentrated application of load. Another problem is that movements can be transmitted to a reinforcing bar in such a way that this can lead to spalling phenomena in the concrete at a top side of the foundation.

The German Patent and Trade Mark Office searched the following state of the art in the priority application: DE 20 2010 005 965 U1, WO 2008/087181 A1, DE 102 26 996 A1, WO 2011/029994 A1 and DE 25 44 657 A1.

BRIEF SUMMARY

One or more embodiments of the present invention are directed to an anchorage of a pylon of a wind power installation In one embodiment an anchoring section is provided for anchoring a pylon of a wind power installation in a foundation. It includes a carrier portion and a foundation portion. The carrier portion is adapted for fixing a pylon segment for carrying the pylon. For example it can have a peripherally extending flange for the placement of a pylon section and with bores for passing fixing screws therethrough. The carrier portion is appropriately arranged above the foundation.

The foundation portion is provided for being concreted into the foundation, that is to say in a corresponding concrete mass of the foundation. For that purpose the foundation portion has at least one web portion which is at least partially concreted into the foundation. The web portion is provided with through openings, through which reinforcing bars or similar elements of a reinforcement for the foundation can be passed. Those through openings can be for example round and are intended to at least partially receive concrete in the concreting operation and can thereby transmit vertical forces into the foundation. This can be boosted by reinforcing bars arranged in the openings. In that respect, a plurality of through bores disposed at differing heights are provided, to achieve significant application of load which is as greatly distributed as possible. In particular there are many through bores which are distributed as uniformly as possible in order to transmit as much load as possible by way thereof.

Preferably the through openings are arranged in a plurality of rows, namely at least 2, 3, 4 or more than 4, which in particular are horizontal. That is intended to provide for uniform distribution of many through openings and thereby to achieve an application of load which is as uniform as possible.

In that way the transmission of load can be quite uniformly distributed, whereby local loading maxima, in particular directly beneath the anchoring section, namely beneath the foundation portion of the anchoring section, are avoided. That is intended to obviate damage due to local loading maxima. Thus, through openings are arranged in the web portion at different heights, that is to say at different vertical positions in the web portion.

Preferably a reinforcing bar is passed through each of those through openings and accordingly the transmission of load can also be effected from the web portion into the reinforcement at different levels in the foundation. Basically uniform distribution of the through openings in the respective row of openings is to be preferred in order also to ensure a transmission of load which is as uniform as possible. Nonetheless in principle other forms of distribution can also be considered.

In an embodiment it is proposed that differing numbers of openings are to be provided in the respective rows of openings in order to achieve a more uniform and in particular stiffness-dependent transmission of load.

Preferably the web portion is in the form of a cylindrical casing portion. That would correspond to a perpendicular web portion which extends peripherally in the shape of a circle. In principle with such a shape or another shape, it is also possible to provide only one segment of a cylindrical casing in order for example to assemble a plurality of segments to form a completely peripherally extending cylindrical casing.

This perpendicular configuration of the web portion, that is to say the configuration of a cylindrical casing, is particularly advantageous for use together with horizontally extending reinforcing bars which can accordingly extend transversely relative to the web and which can be passed transversely through the web portion in the region of a respective through opening. That affords an advantageous transmission of load from the pylon to the reinforcement of the foundation by way of the anchoring section.

The web portion—relative to a perpendicular sectional view—can be placed slightly inclinedly transversely relative to the peripheral direction of the web portion, which leads to a shape in the form of a frustoconical peripheral surface. The use of a shape which is thus circular—in a plan view on to the anchoring section—is the preferred embodiment. This circular shape is in that respect substantially governed by the shape of the lower pylon segment to be placed thereon.

It is desirable if the carrier portion is in the form of a flange. In that way a lower pylon segment can be placed on such a carrier or flange portion—possibly with the use of a compensating means—and fixed thereon. In that respect the carrier portion is advantageously in the form of a flange in the sense of a fixing flange.

It is also advantageous if an anchoring portion or the like which would also be in the form of a flange is avoided on the web portion, at a side facing away from the carrier portion. Then load transmission is effected exclusively or substantially by way of the through bores, possibly supported by reinforcement passed therethrough. Concentration of the load application by way of other anchoring portions is avoided.

In particular an anchoring portion of a conventional anchoring section, and the risks linked thereto of foundation damage, can be avoided.

It is desirable for the anchoring section to be provided in the form of a steel section. This is thus matched to the connection to a lower pylon section of steel—with or without compensation means.

A further preferred embodiment proposes that the through openings are each of a substantially oval and/or elliptical configuration and appropriately involve a vertical orientation. In the case of appropriate anchoring therefore the through openings are of a greater extent in the vertical direction than in the horizontal direction. That can be effected by a substantially elliptical or oval shape. In principle rectangular or polygonal shapes can also be considered.

It is desirable—for this or other shapes of the through opening—if the dimensioning of the through openings for the intended situation of use is such that a respective reinforcing bar can be passed through a through opening in such a way that the reinforcing bar does not touch that opening. There is thus not a direct contact between the reinforcing bar and the anchoring section. The transmission of load is effected from the anchoring section by way of a material arranged between the respective reinforcing bar and the web portion in the through opening. That can also be for example a casting material like the concrete material of the foundation. The transmission of load is therefore from the web portion by way of that material surrounding the reinforcing bar, to the reinforcing bar, and from there further into the foundation or directly from the web portion into the foundation by way of the through openings. The substantially elliptical or oval shape of the through opening affords a larger spacing between the reinforcing bar and the opening or the edge of the opening in a vertical direction. In that region there is correspondingly also more interposed material which is thus intended to promote the transmission of load in a vertical direction.

Preferably the through opening has a mean diameter of more than 80 mm, preferably more than 100 mm and in particular more than 110 mm. That size ensures that a reinforcement or a reinforcing bar can be well passed through the through opening and space still remains for the concrete material. The basic starting point adopted for that purpose is a reinforcing steel member which is of a diameter of about 25 mm, possibly less. There is then sufficient space for concrete with included gravel of a grain size of a maximum 32 mm mean diameter, in particular for grain sizes of about 32 mm mean diameter, which is preferably proposed for use.

Oval or elliptical through bores have a large and a small diameter, wherein the small diameter is in the range of 50-90 mm, in particular 60-80 mm, and the large diameter is in the range of 90-130 mm, in particular 100-110 mm. That makes it possible to achieve an advantageous application of load by means of the through bores.

Preferably the through bores are clad with an elastic and/or yielding material, in particular a synthetic foam. That makes it possible to achieve flexibility at the edge of the through bores, which prevents the occurrence there of local loading maxima.

In addition there is proposed a substructure of a wind power installation for anchoring a pylon of the wind power installation, which proposes a concrete foundation with an anchoring section. Such a substructure thus comprises substantially the reinforced steel concrete foundation with steel reinforcement and an anchoring section. Bars of the reinforcement of that reinforced concrete are passed—at least partially—through through openings in the anchoring section in order thereby to achieve transmission of load from the anchoring section to the foundation by way of the reinforcement or at least to improve such transmission of load. Such a substructure comprising foundation and anchoring section therefore promises to be stable and durable and to ensure transmission of load which is as uniform as possible in order correspondingly to form a stable substructure for a pylon of a wind power installation.

Preferably the substructure is of such a configuration that the carrier portion, in particular a peripherally extending horizontal fixing flange, is spaced relative to the concrete foundation. After the concrete of a concrete foundation has set, that is to say hardened, that gives a solid surface for the concrete foundation, which substantially comprises concrete. The carrier portion is thus at a spacing relative to that surface. That promotes in particular fixing of a lower pylon section on the anchoring section.

The substructure of a further embodiment is characterized in that portions of the reinforcement, in particular reinforcing bars, that extend through the through openings, are surrounded in the through opening by a filling material, in particular concrete, so as to avoid contact between those portions and the through openings.

The filling material avoids direct contact between reinforcing bars and the anchoring portion. That avoids local loading maxima which can occur if a direct contact and thus direct transmission of force from the foundation portion of the anchoring section to a reinforcing bar were to occur. Moreover for galvanic reasons, that is to say to avoid a galvanic connection between the anchoring section and the reinforcement, it may also be advantageous to avoid that direct contact. Load transmission is then effected indirectly from the anchoring section to the respective reinforcing bar by way of the filling material.

Avoiding contact between the reinforcing bars and the through opening is to be interpreted as meaning that the reinforcing bars do not touch an edge of the through openings and thus the reinforcing bars do not in any way touch the anchoring section at all.

To prevent load transmission into the concrete foundation beneath the anchoring section a compressible, in particular elastic material is preferably arranged beneath the anchoring section. For example it is proposed that a foam material and/or plastic material be arranged as the compressible material, to give just two examples.

In addition there is proposed a wind power installation having a pylon, in which the pylon is anchored by means of an anchoring section and on a substructure as described hereinbefore. Such a wind power installation therefore has a foundation in which an anchoring section is anchored, on which the pylon of a wind power installation is fixed.

There is further proposed a method of anchoring a pylon of a wind power installation. That method includes at least the steps: preparing a reinforcement of a concrete foundation of a wind power installation together with an anchoring section for anchoring the pylon in the concrete foundation, wherein portions of the reinforcement, in particular reinforcing bars, are passed through through openings in a web portion of the anchoring section at different heights, and pouring and hardening the concrete foundation to anchor the anchoring section in the concrete foundation.

Thus firstly a reinforcement of a concrete foundation of a wind power installation together with an anchoring section is prepared. Therefore a lattice of the reinforcement is prepared in a structural excavation in which the foundation is later to be placed. The anchoring section is also set in position. The anchoring section has through openings and the reinforcement is so prepared, together with the anchoring section, that reinforcing bars of the reinforcement extend through the through openings in the anchoring section.

In the next step the concrete material is poured into a shuttering arranged in the excavation and encloses the reinforcement completely and the anchoring section partially, namely in the region of its foundation portion and thus also in the region of the through openings. Finally the concrete material has to harden.

It is desirable for the portions of the reinforcement to be passed through the through openings in such a way that they do not touch the through openings and are surrounded by filling material in the pouring operation.

BRIEF DESCRIPTION OF THE SEVERAL VIEWS OF THE DRAWINGS

The invention will be described by way of example hereinafter by means of embodiments with reference to the accompanying Figures.

FIG. 3 shows a perspective view of a portion of an anchoring section in accordance with an embodiment of the invention, FIG. 4 shows a side view in section showing a reinforcing bar passing through a through opening, FIG. 5 shows a diagrammatic view from another perspective of a through opening as shown in FIG. 4.

DETAILED DESCRIPTION

The description of the invention by reference to the accompanying Figures makes use of diagrammatic illustrations. Therein identical references can be used for similar elements which are not identical or similar elements which are not identically illustrated.

Figure 1:
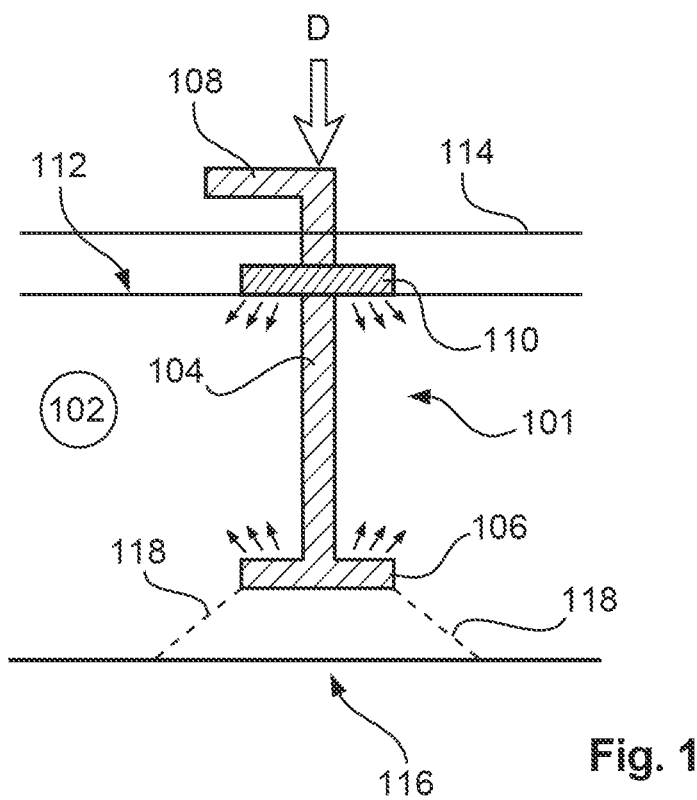
FIG. 1 shows a sectional view of an anchoring section to illustrate the state of the art.

FIG. 1 shows a side view in section of a basically known anchoring section 101 and the anchoring section 101 is in part let into a concrete foundation 102. The concrete foundation 102 is not shown with hatching for the sake of clarity of the drawing. The anchoring section has a web portion 104 which for the major part is concreted in place and which at its underside has an approximately horizontal flange portion 106 as an anchoring portion. Provided at an upper end is a fixing flange 108 to which a lower pylon section can be fixed. The anchoring section 101 also has a further support flange 110 which can be supported on a plane 112 illustrated by way of example, to apply pressure forces to the foundation 102. The support flange 110—as shown—can also be cast into the concrete foundation 102 and also has a spacing of for example 20 cm from its upper edge to an upper edge 114 of the concrete, that is to say the concrete foundation. Alternatively the support flange 110 rests directly on a top side of the concrete so that the illustrated plane 112 then indicates the upper edge of the concrete and the upper edge 114 is no longer there.

Loads on the anchoring section 101 which act substantially in a vertical direction are primarily transmitted to the concrete foundation 102 by way of the anchoring portion 106 and the support flange 110. In that respect, local loading maxima occur in those regions around the anchoring portion 106 and the support flange 110. By way of example a downwardly acting load—the pressure D—on the anchoring portion 106 can be transmitted from same into the concrete foundation 102 in such a way that a force radiates approximately in a funnel shape from the anchoring portion 106 into the lower region of the concrete foundation 102. Accordingly there is the danger that such a funnel-shaped portion 116 will break out of the foundation or defects, breaks or cracks can be formed at least at its edges. Such potential damage regions 118 are shown in broken line in FIG. 1 for illustration purposes.

Equally tensile loadings acting on the anchoring section 101 can lead to similar local loading maxima and similar damage and cause breaks or cracks above the support flange.

Figure 2:
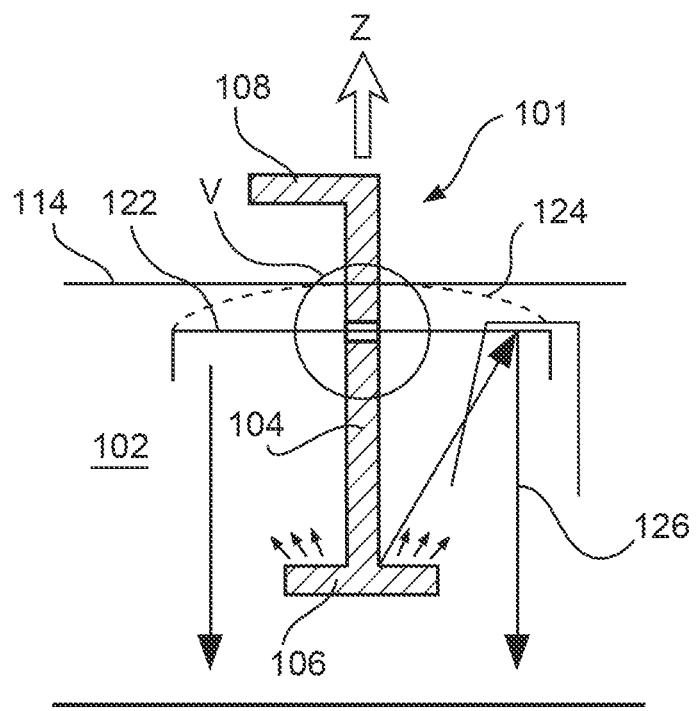
FIG. 2 shows a sectional view of a further anchoring section to illustrate the state of the art.
Figure 6:
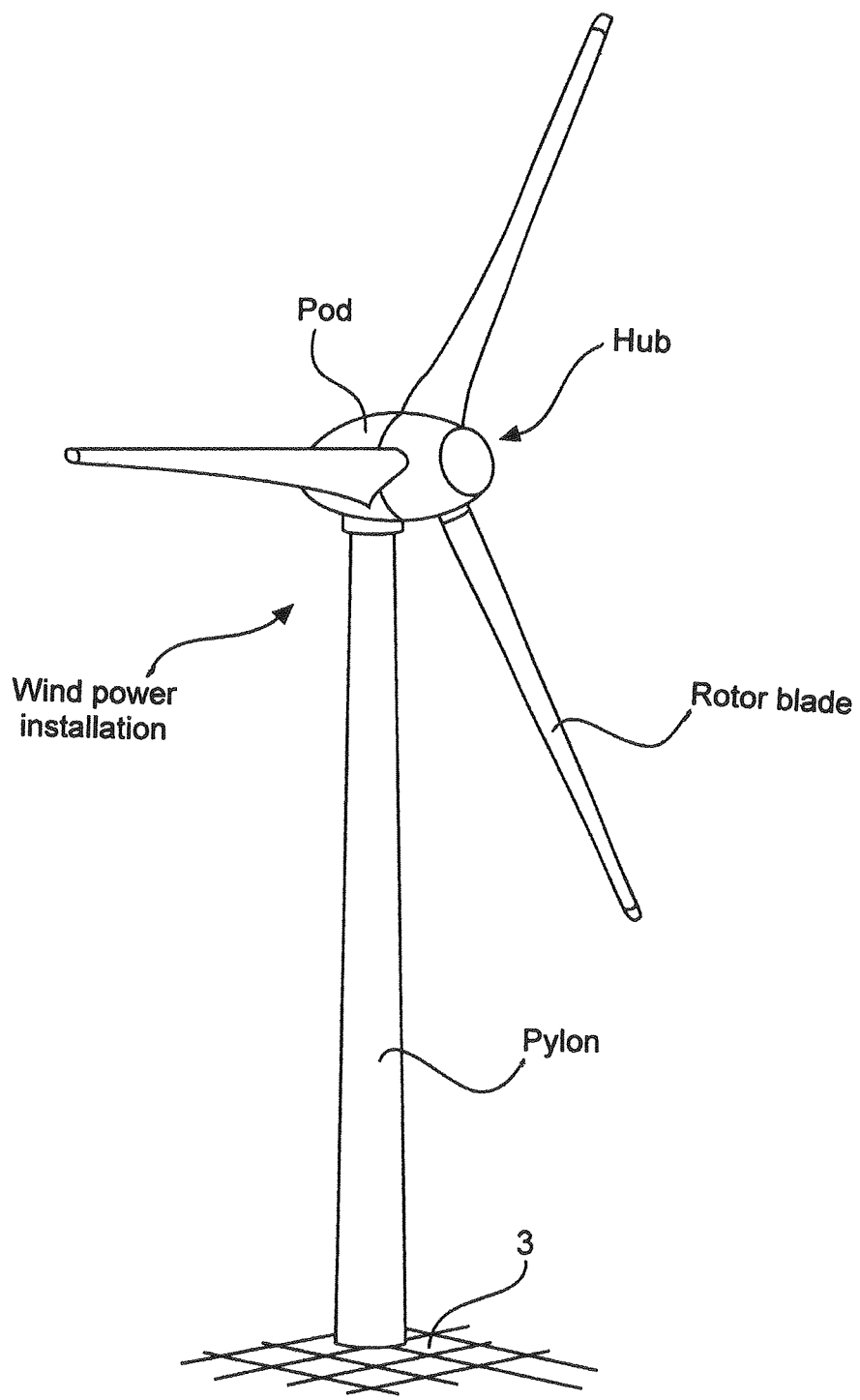
FIG. 6 shows an overall view of a wind power installation.

A further anchoring section 101 as shown in FIG. 2 has a web portion 104 with an anchoring portion 106 and a fixing flange 108. The web portion 104 is let into a concrete foundation 102 partially and the anchoring portion 106 is completely let into the concrete foundation. The fixing flange 108 and a part of the web portion 104 project above the upper edge 114 of the concrete foundation 102.

FIG. 2 also shows a through opening 120 through which a reinforcing bar 122 is passed. The reinforcing bar 122 is part of a reinforcement of the concrete foundation 102, which is not further illustrated in FIG. 2.

The reinforcing bar 122 is provided to carry horizontal forces. In the case of a tensile loading Z acting on the anchoring section 101 a part of the corresponding load can be transmitted by unwanted load application to the reinforcing bar 122 which is here representative of a large number of reinforcing bars which are not shown in this sectional view. A resulting loading is applied to the concrete foundation 102 by way of the reinforcing bar. The reinforcing bar bends due to an unwanted vertical application of load and leads to loads on the concrete. The broken line 124 illustrates a reinforcing bar which is bent in that way, in an exaggerated form for illustration purposes. Thus damage to the concrete at the top side thereof can also occur as a result.

When an illustrated tensile loading Z occurs a part of the load is also transferred from the anchoring portion 106 upwardly into the concrete foundation 102. Such an application of force from the anchoring portion 106 is shown in FIG. 2 by a load path 126. That begins at a top side of the anchoring portion 106 and extends from there as a broken line with respect to the reinforcement—the reinforcing bar 122—and from there back downwardly in a vertical direction into the foundation. There are thus in part diagonal directions in which in part concentrated forces act, which can lead to a detrimental concentration of loading.

FIG. 3 illustrates the basic structure of an anchoring section 1 according to an embodiment of the invention. The anchoring section 1 in FIG. 3 has a carrier portion or a fixing flange 8 with a plurality of fixing openings 30. The lower pylon section is configured to be fixed to the fixing flange by the plurality of fixing openings 30 and connectors, such as nuts and bolts, as is well known in the art. The anchoring section includes a foundation portion 3 that includes a web portion 4 that is concreted substantially in a concrete foundation 2, the upper edge 14 of which is indicated for illustration purposes. The concreted-in portion of the web portion 4 has a plurality of through openings 20, through each of which is passed a respective reinforcing bar 22. The reinforcing bar 22 can also be referred to as a through-fitting reinforcement and comprises concrete steel. In FIG. 3 reinforcing bars 22 are shown as being passed through openings 20, only in some of the openings 20, which can also be referred to as bores. That shows that an application of load can also be effected directly to the concrete by way of the through openings 20, without a respective reinforcing bar having to be used. Other embodiments can be of such a design configuration that a reinforcing bar or similar or comparable component of a reinforcement is passed through each opening. The through openings 20 in FIG. 3 are arranged in a plurality of horizontally extending rows, more specifically in the illustrated embodiment in three rows. At the same time this arrangement involves substantially uniform distribution of the through openings, also promoted by the row-wise arrangement. That is intended to permit application of load, which is as uniformly distributed as possible, from the anchoring section 1 by way of the through openings and possibly or in part by way of the reinforcing bars 22, to the foundation 2. The plurality of distributed through openings accordingly permits distribution of the application of load in order thereby to distribute the load in the foundation and to avoid loading concentrations and in particular damage resulting therefrom.

Preferably the web portion 4 is in the form of a cylindrical casing portion. That would correspond to a perpendicular web portion which extends peripherally in the shape of a circle. In principle with such a shape or another shape, it is also possible to provide only one segment of a cylindrical casing in order for example to assemble a plurality of segments to form a completely peripherally extending cylindrical casing.

The web portion 4 —relative to a perpendicular sectional view —can be placed slightly inclinedly transversely relative to the peripheral direction of the web portion, which leads to a shape in the form of a frustoconical peripheral surface. The use of a shape which is thus circular —in a plan view on to the anchoring section —is the preferred embodiment. This circular shape is in that respect substantially governed by the shape of the lower pylon segment to be placed thereon.

FIG. 4 diagrammatically shows a view on an enlarged scale of a through opening 20 with reinforcing bar 22 passing therethrough. This enlarged view shows that the reinforcing bar 22 is positioned in the through opening 20 in the web portion 4 that the web portion 4 and thus an edge of the through opening 20 are not touched. For that purpose the reinforcing bar 22 is surrounded in the through opening 20 by a filling material 28. Forces, such as shearing forces, can thus be carried by the reinforcing bar 22 of the web portion 44 and thus the anchoring section 1. In that case a force is transmitted from the web portion 4 to the reinforcing bar indirectly by way of the filling material or intermediate material.

FIG. 5 shows a detail view of an embodiment of a through opening 20. The through opening 20 is thus substantially of an oval shape, the longitudinal direction thereof extending in a vertical direction in appropriate use of the anchoring section. A reinforcing bar 22 surrounded by a filling material 28 is shown in cross-section in the through opening 20. By virtue of the substantially oval shape of the through opening 20 there is markedly more filling material above and below the reinforcing bar 22 than laterally thereof. It is to be noted that this diagrammatic view does not correctly reproduce the size relationships, for the purposes of better illustration. In particular, in a view to scale, the diameter of the reinforcing bar would be substantially smaller than is shown in FIG. 5.

Thus, to improve a foundation for a wind power installation pylon and in particular also for saving cost, a solution is proposed, which in particular involves an anchoring section for partial concreting in a steel reinforced concrete foundation. The solution permits in particular efficient transmission of force which is as uniform as possible from the anchoring section into the foundation.

A load is thus transmitted from the web portion by way of the filling material to the reinforcing bar and further into the foundation, and/or directly from the web portion in the region of the through openings into the foundation. The filling material which thus surrounds the reinforcing bar and which can be made from concrete can thus also be referred to as a concrete dowel.

To prevent a load from being transmitted into the concrete foundation beneath the anchoring section, a compressible and in particular elastic material 300 is preferably arranged beneath the anchoring section. By way of example it is proposed that the compressible material 300 be a foam material and/or plastic material to give just two examples.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An anchoring section for anchoring a pylon of a wind power installation in a foundation, the anchoring section comprising:
   a carrier portion for fixing to a pylon segment above the foundation and for carrying the pylon, and
   a foundation portion fixedly connected to the carrier portion for concreting into the foundation, the foundation portion having a web portion that extends in a substantially vertical direction and has a plurality of through openings arranged at different heights, the plurality of through openings being configured to receive reinforcing bars, the foundation portion being configured to transmit vertical forces into the foundation,
wherein the web portion is at least one of a cylindrical casing portion and a frustoconical casing portion that forms a cylindrical shape or a frustoconical shape when assembled with a plurality of anchoring sections, wherein the web portion terminates at an end that is remote from the carrier portion, the end being without a flange.

2. The anchoring section according to claim 1 wherein the plurality of through openings are arranged in rows.

3. The anchoring section according to claim 1 wherein the carrier portion is a flange.

4. The anchoring section according to claim 1 wherein the anchoring section includes a steel material.

5. The anchoring section according to claim 1 wherein the plurality of through openings have a substantially oval or elliptical and a longitudinal length extending in a vertical orientation.

6. A substructure of a wind power installation for anchoring a pylon of the wind power installation including a concrete foundation with an anchoring section according to claim 1.

7. The substructure according to claim 6 wherein portions of the reinforcement bars are set into the concrete foundation and extend through the through openings in the anchoring section to provide for a transmission of load from the anchoring section into the concrete foundation by way of the reinforcing bars.

8. The substructure according to claim 6 wherein the carrier portion of the anchoring section is spaced above a surface of the concrete foundation.

9. The substructure according to claim 6 wherein portions of the reinforcing bars that extend through the plurality of openings are surrounded in the through opening with a filling material.

10. A wind power installation comprising:
    a pylon that includes a first pylon segment that is anchored by an anchor, the anchor including an anchoring section according to claim 1.

11. A method of anchoring a pylon of a wind power installation, the method comprising:
    placing an anchoring section accordingly to claim 1 in a structural excavation;
    placing reinforcement bars in the plurality of through openings so that a portion of the reinforcement bars extend through the plurality of through openings; and
    pouring and hardening a concrete foundation over the web portion of the anchoring section, the flange extending above the concrete foundation.

12. The method according to claim 11 wherein the portion of the reinforcement bars that extend through the through openings are surrounded by a material so that the reinforcement bars do not touch a surface formed by the through openings.

13. The method according to claim 12 wherein the material surrounded the reinforcement bars is the concrete foundation.

14. The anchoring section according to claim 5 wherein the plurality of through openings have a mean diameter between 80 mm and 110 mm.

15. The substructure according to claim 9 wherein the filling material is concrete.

* * * * *